F. L. PERRY.
Cultivator.
No. 96,344. Patented Nov. 2, 1869.
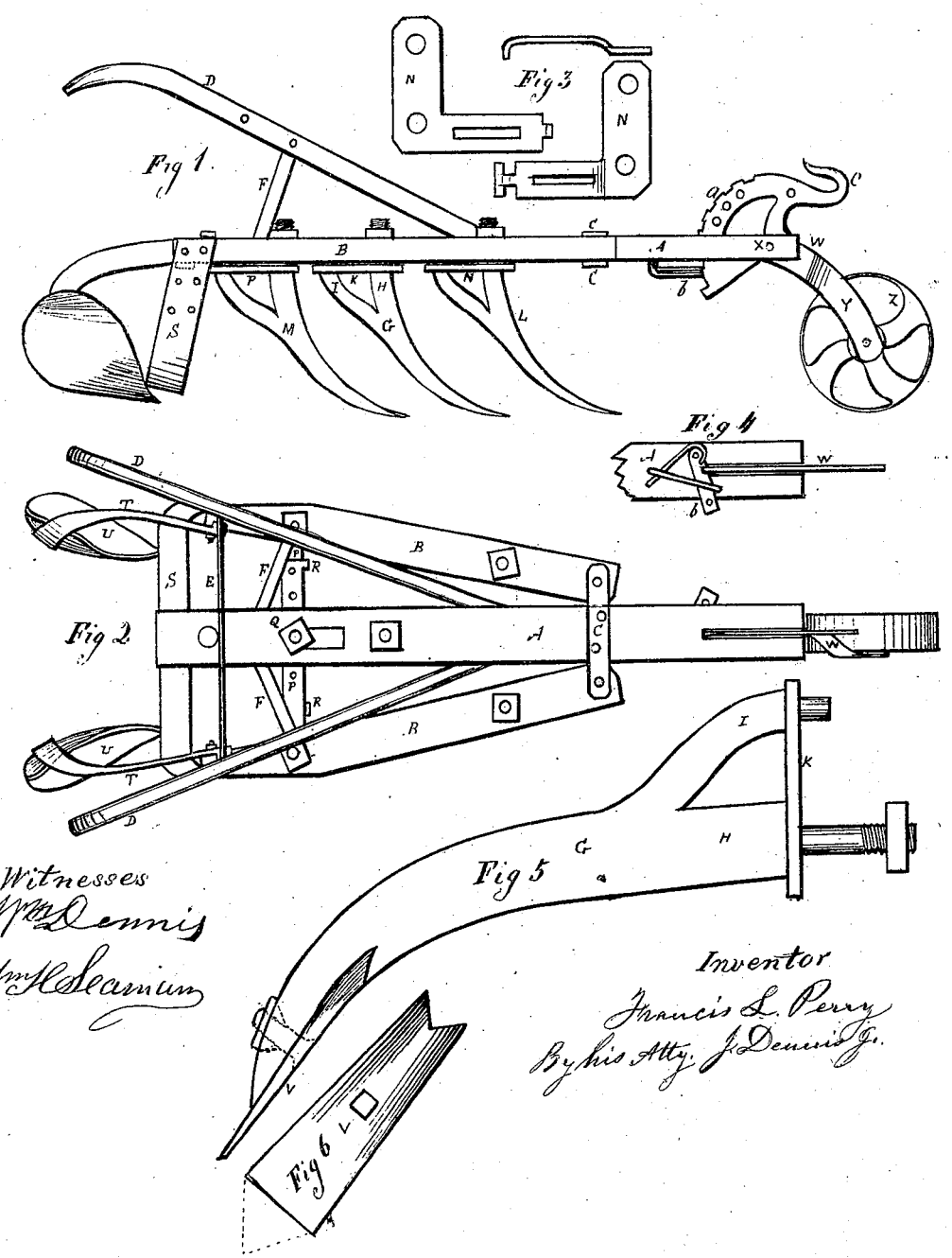

UNITED STATES PATENT OFFICE.

FRANCIS L. PERRY, OF CANANDAIGUA, NEW YORK.

IMPROVEMENT IN CULTIVATORS.

Specification forming part of Letters Patent No. 96,344, dated November 2, 1869.

*To all whom it may concern:*

Be it known that I, FRANCIS L. PERRY, of Canandaigua, Ontario county, in the State of New York, have invented certain new and useful Improvements in Cultivators; and I hereby declare the following to be a full and exact description thereof, reference being had to the accompanying drawings, forming part of this specification.

The nature or essence of my invention consists in the peculiar construction and arrangement of devices described and claimed in the following specification and represented in the drawings.

In the accompanying drawings, Figure 1 is a side elevation of a cultivator with my improvements. Fig. 2 is a plan or top view of the same. Fig. 3 shows the plates on the front teeth; Fig. 4, the spring-latch under the beam; Fig. 5, one of the teeth, and Fig. 6 the steel point.

A is the beam of the cultivator, and B B the side bars, connected to the beam by the bolts and plates C C, so that the bars B can be vibrated toward and from the beam as required.

D D are the handles, connected by the bar E and supported by the braces F F, fastened to the beam.

The center tooth, G, of the cultivator is made in the form shown in Fig. 5, and has two prongs, H and I, which are provided with lugs and shoulders, as shown in the drawings.

The lug of the front prong, H, extends or passes through the plate K on the under side of the beam and through the beam, and is provided with a screw-nut to hold it fast in the beam. The lug of the rear prong, I, extends through the plate K and a short distance up into the beam, to prevent the tooth from turning in the beam.

The front teeth, L, and the rear teeth, M, are made like the tooth G, except that the lugs of the rear prongs do not extend through the plate into the wood above, but simply through the plate, which is sufficient to prevent the teeth from turning. The plates for the front and rear teeth are all made L-shaped, or with an arm, and the arms of the front plates, N N, are slotted, as shown in Fig. 3, and provided with lugs at the ends of the arms, to traverse in the slots and hold the arms parallel and the teeth in the plates parallel, whether the cultivator is set wide or narrow. The lug on one of the plates N is made T-shaped, and to put the T-head of the lug through the slot in the other plate the arms are placed at a right angle to each other, and the lug put through, and the plates brought around parallel, and the lug on the other plate dropped into the slot, and they are put on the frame to receive the shanks or lugs of the teeth. The arms of the plates P P for the rear teeth are not slotted, but perforated with a series of holes for the bolt Q, which fastens them to the beam A, and by changing the bolt in the holes in the arms the cultivator may be set wide or narrow to adapt it to the rows of crops worked. The ends of the arms of the plates P P are provided with lugs R R, which pass up or down each side of the opposite arm, to hold the arms parallel to each other and the teeth parallel, whether the cultivator is set wide or narrow.

I cut off the rear outside corners of the bars B and make a horizontal knife or cutter, S, to run behind the teeth in the loosened earth stirred by the teeth and cut off the roots of weeds and other foul stuff. The ends of this knife S are turned up and bolted to the bars B, as shown in the drawings. The ends of the cutter S which are turned up are provided with a series of holes or slots for the bolts, so as to set it higher or lower on the bars, as may be desired; and the same bolts which fastne the cutter S may be used to fasten the arms T T, which are made in the form shown, to carry the hilling-shares U U fastened to the arms, as shown in the drawing. The arms T are provided with lugs, which clasp or project over and under the bars to prevent the arms from vibrating.

The points of the shares U project under and against the rear of the cutter S, which is curved where it is turned from a horizontal to a perpendicular position, so as not to cut too close to the roots of plants cultivated.

I make my cultivator-teeth in the form shown in Fig. 3, with a removable steel point, V, made square and flat at the end and gradually narrower as it recedes from the front, and narrow the shank, so that it shall pass easily through the soil and be drawn by less power than most cultivators.

The steel points I make in the form shown at V and fasten them with a bolt, which has a nut fitted to a countersink in the under side of the tooth. If the cultivator is to be used in very hard ground, the teeth may be made with an angular point. (See dotted lines, Fig. 5.)

The clevis-plate W is fitted to vibrate in a score in the end of the beam A, on the pin $x$. It is made in the form shown, with an arm, Y, to carry the axle of the gage-wheel Z, as shown in the drawings. It is also provided with a notched segment, $a$, for the spring-latch $b$ on the under side of the beam to catch into and hold the wheel Z higher or lower, to graduate the depth the cultivator is to mark in the earth. On the upper end of the segment $a$ a hook, C, is formed, for the draft-chain to draw the cultivator. A wire or line may be attached to the latch $b$ and carried back by the side of the handle, so that the holder can release the segment $a$ and change the position of the gage-wheel without stopping the cultivator. If the latch $b$ should be broken, there is a series of holes in the plate W, in which a pin may be inserted to hold the plate in the position desired.

The teeth of this cultivator are made thin and narrow to loosen the ground with a light draft, and the cutter S follows after, to cut off the roots of weeds and destroy them.

What I claim as my invention and improvements in cultivators is—

1. The arrangement of a series of cultivating-teeth in front of and in combination with the horizontal knife or cutter S, which follows the teeth.

2. Arranging the points of the teeth which run in advance of the horizontal cutter lower than the cutter, to protect the cutter from stones and other obstructions.

3. Curving the ends of the horizontal cutter, as shown and described, so as not to cut too deep near the rows of plants cultivated.

4. Making the horizontal cutter adjustable higher or lower on the frame, substantially as described.

5. In combination with the stirring-teeth and horizontal cutter, the hilling-shares, arranged in rear of the horizontal cutter, substantially as described.

6. The combined clevis and gage-wheel stand or plate, arranged to vibrate in the end of the beam, and provided with a notched segment and spring-latch, so that the workman can release, adjust, and lock the clevis and gage-wheel in the position required while the cultivator is at work or in motion.

F. L. PERRY.

Witnesses:
JOHN WHITE,
GEO. N. MEAD.